May 15, 1956 — L. ROSTOKER — 2,745,896
VIBRATION DAMPING DEVICE
Filed Dec. 6, 1954 — 2 Sheets-Sheet 1

INVENTOR
Louis Rostoker
By: J. Richard Kavanagh

May 15, 1956 L. ROSTOKER 2,745,896
VIBRATION DAMPING DEVICE
Filed Dec. 6, 1954 2 Sheets-Sheet 2

INVENTOR
Louis Rostoker
By: J. Richard Cavanagh

United States Patent Office 2,745,896
Patented May 15, 1956

2,745,896

VIBRATION DAMPING DEVICE

Louis Rostoker, Toronto, Ontario, Canada

Application December 6, 1954, Serial No. 473,371

10 Claims. (Cl. 174—42)

This invention relates to a method and apparatus for damping vibrations in electrical transmission lines and like freely suspended tensioned cables or guys supported at spaced apart points. More specifically, the invention finds its application in damping vibrations occurring in high tension tower supported cross-country electrical lines.

The vibrations that occur in so-called "electrical high tension lines" are caused by both physical and atmospheric disturbance or change. While in the first instance, the vibration or disturbance may be of relatively high frequency, i. e., greater than about one hundred cycles per second in the general class of vibrating systems under consideration herein, the passage of the high frequency wave past a suspension point may, by reason of reflections therefrom and the resonant character of the suspension system, give rise to travelling harmonic waves or vibrations. Various harmonics may be generated. Upon accident of superposition of two or more waves, a wave of very low frequency and large amplitude may be generated, giving rise to a condition known as a "galloping wave." The amplitude of vibration or lateral lash may become so great as to rupture the line.

Heretofore, attempts have been made to minimize the high frequencies by placing a depending form of vibration damping device for damping high frequencies about six feet from the nodal point of each line span. While the device has been effective in modifying high frequency vibrations, it has been rendered substantially inoperative under icing conditions when it is most needed. Furthermore, the harmonic travelling waves and galloping waves are not necessarily damped by damping devices of the prior art.

It is thus the main object of the invention to provide a method and apparatus for damping high frequency waves, harmonics thereof and so-called galloping waves in high tension electrical transmission lines and the like.

Other objects of the invention will be appreciated from a study of the following specification taken in conjunction with the accompanying drawings.

Figures 1, 2, 3:
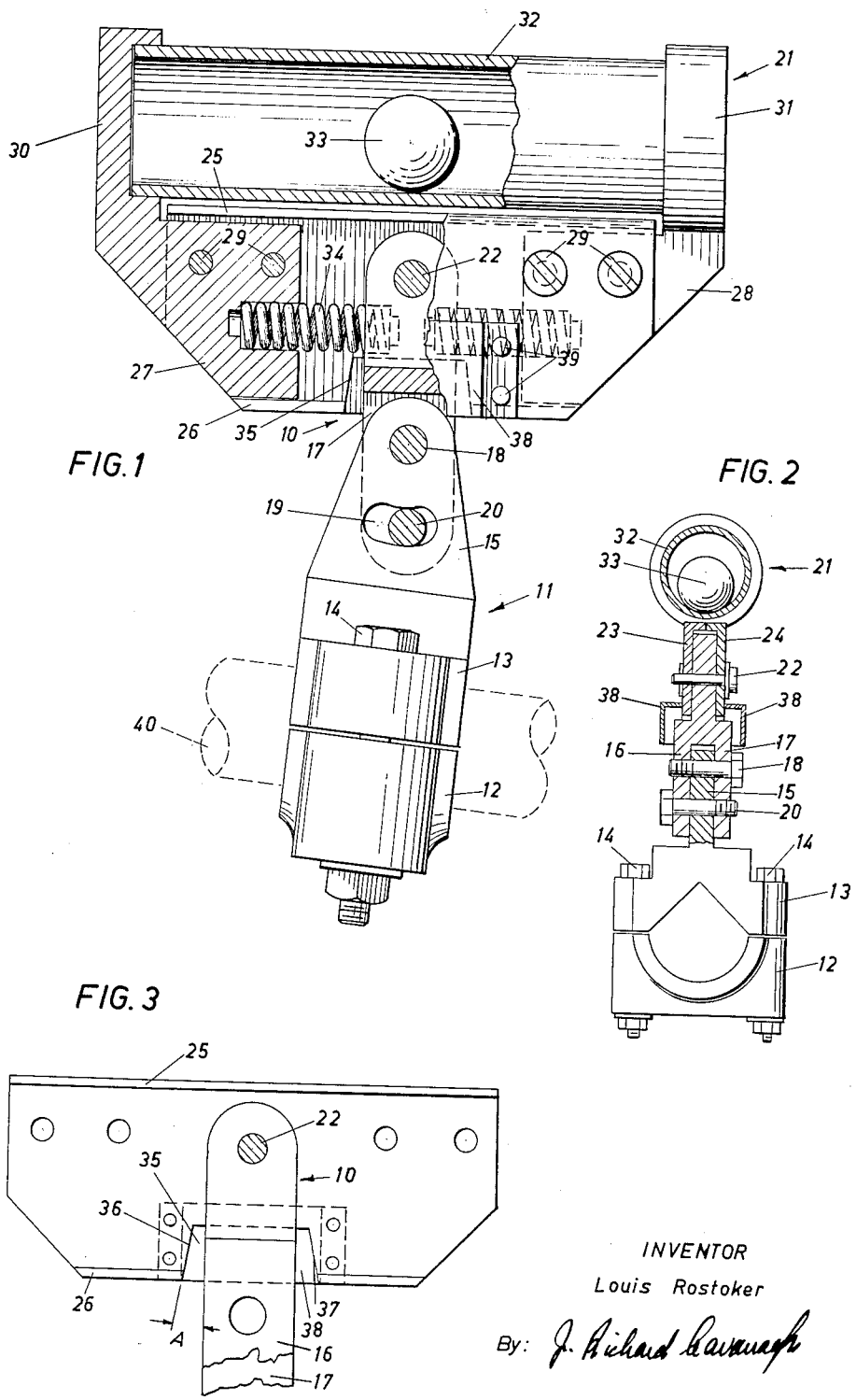
Figure 1 is a side elevation of a vibration damping device of the invention with portions thereof cut away to reveal details of construction.
Figure 2 is a sectional view of the device of Figure 1 on the line 2—2 thereof.
Figure 3 is a detail from Figure 1 showing the support post and a side plate thereon.

Referring to the drawings, a vibration damping device of the invention is preferably of the improved form shown in Figures 1 to 3 and comprises a support post 10 pivotally mounted in clamping bracket 11, the latter being adapted for clamping engagement about an electrical cable 40 or the like. Bracket 11 has a lower jaw 12 designed to be drawn toward the clamp body 13 by bolts 14. The upright tongue 15 of body 13 extends between depending spaced apart arms 16 and 17 of post 10 pivotally supporting the latter by bolt 18. An arcuate slot 19 freely accommodates locking bolt 20 located near the lower end of the arms. The post 10 therefore may be adjusted angularly with respect to the bracket 11 to dispose the post in the true vertical position though the bracket may be inclined relative to the horizon by reason of it being clamped upon a downwardly sloped portion of a cable or the like suspended between two points.

As shown in Figure 2, each of the bolts 18 and 20 is threaded over a portion only of its length. A damping element 21 preferably of the random inertia class is pivotally mounted on pin 22 at the upper end of post 10. Side plates 23 and 24 have inwardly directed upper and lower flanges 25 and 26 and are adapted to mount the brackets 27 and 28 by screws 29. Brackets 27 and 28 extend upwardly to provide end fittings 30 and 31 respectively adapted to receive tube 32 accommodating a free body or ball 33. Compression springs 34 extend from either side of post 10 below pin 22 to brackets 27 and 28 to bias the damping element 21 to a horizontal position when the post is correctly supported in a vertical position. An opening 35 is provided in each side plate to freely accommodate the upper portion of arms 16 and 17 of post 10 and to define angular abutment surfaces 36 and 37 limiting angular deflection of the damping element from the biased position to an angle A of about four degrees in either direction as shown in Figure 3. A weather cap 38 extends exteriorly over opening 35 of each side plate being held thereon by rivets 39.

Figure 4:
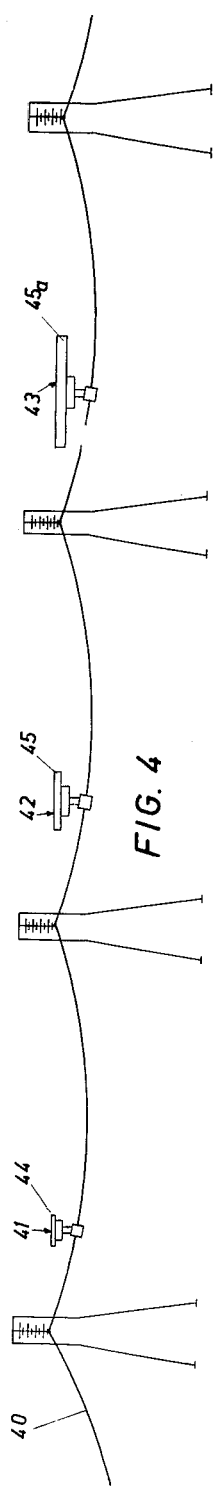
Figure 4 illustrates the method and apparatus of the invention as applied to the damping of vibrations in a high tension tower transmission line.

According to the method of the invention, a plurality of damping devices are formed having damping elements of different characteristics. The moment of inertia of the damping element about pin 18 is modified preferably by lengthening tube 32 and increasing the weight of ball 33. The ball 33 effects disturbance of the natural period of oscillation or resonance of the mechanical system of the damping element about pin 18 and oscillates from one end of tube 32 to the other to increase the striking force of the abutment surfaces 36 and 37 against post 10, thus generating counter impulses transmitted through mounting bracket 11 to the cable or conductor 40 as shown in Figure 4. A series of groups of damping devices 41, 42 and 43 are mounted on conductors 40 in such manner that high frequency vibrations are damped by device 41 forming damping element 44, intermediate frequency vibrations are damped by device 42 having a damping element 45 of greater length and the galloping waves are damped by device 43 having a damping element 45a of relatively great length.

It should be observed that the upright disposition of the damping elements above the conductor 40 avoids icing conditions formerly encountered with the suspended arrangement of the prior art wherein water could drain over and freeze to encase the damping element in ice. The disposition of the damping element above the bracket clamp therefor is thus desirable for continued operation under icing conditions.

Figure 5:
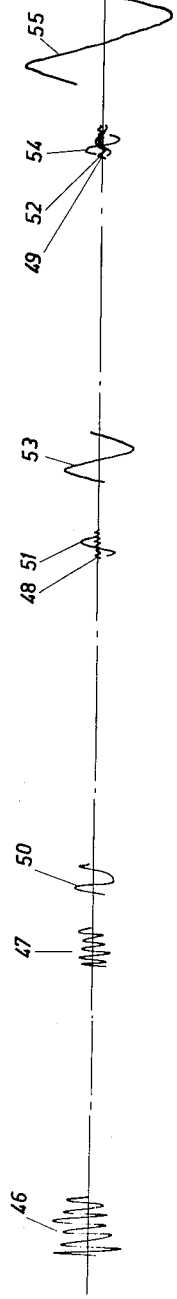
Figure 5 is intended to illustrate the vibrations at various points in the line of Figure 4 without damping devices applied.

In Figure 5, vibration wave forms are indicated for the conductor 40 without damping devices thereon. High frequency wave 46 dissipates its energy over distance as will be evident at 47, 48 and 49. Intermediate wave 50 derived from reflection and/or harmonic effects is of larger initial amplitude but again dissipates its energy over distance as indicated at 51 and 52. Wave 50 is only intended to represent one wave of many which may exist usually in complex form. Another such wave 53 may take the form shown and will dissipate as at 54. However, a further wave constituting a so-called galloping wave of sufficient amplitude causing rupture of the conductor 40 may arise from the variety of vibrations.

In Figure 4, the damping devices shown are applied consecutively to a plurality of cable spans in similar groups. Thus, the following three spans to the right of the figure (not shown) would carry damping devices 41, 42 and 43 in the same order, followed by a similar group repeating in this manner and wherein each group contains both high frequency and lower frequency damping devices. Preferably, the devices in each group are arranged in the same order so that vibrations of all span groups are damped in the same order of progression. Thus in Figure 4, the high frequency vibrations are damped in the first span followed by intermediate damping in the second span and low frequency damping in the third or last span of the group. Preferably, also, each group of a series contains the same number of cable spans.

Figure 6:
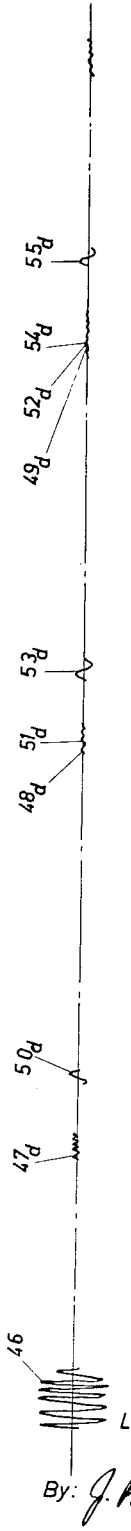
Figure 6 is intended to illustrate the vibrations at various points in the line of Figure 4 as damped by the method and apparatus of the invention.

In Figure 6, the waves of Figure 5 are shown in damped form as the result of the action of the damping devices shown in Figure 4. The subscript "d" indicates the resulting damped form of corresponding vibrations illustrating that the devices and arrangement thereof according to the invention, damp galloping waves not heretofore accomplished by the suppression of high frequency vibrations alone.

It is to be noted that springs 34 shown in Figure 1 are compressed sufficiently and are of sufficient biasing pressure to bias the damping element against self oscillation or false action arising from exterior forces such as a wind gust. By this means the device of the invention avoids action as a vibration generator whereas prior devices tend to become a source of vibrations under action of light wind force.

It is intended that the present disclosure should not be construed to exclude obvious modifications thereof falling within the scope of the following claims.

What I claim as my invention is:

1. A device for damping vibrations in tensioned cable and the like, comprising: a clamping bracket adapted to be fastened rigidly to said cable; a post having upper and lower ends; means adjustably mounting the lower end of said post on said bracket to dispose said post in a fixed vertical position above said cable; a damping element; means pivotally mounting said damping element on the upper end of said post for rocking motion thereon responsive to vibrations in said bracket; means on said damping element limiting the angle of rocking motion thereof with respect to said post and providing a counter-impulse in said post and bracket responsive to said vibrations to effect damping of the latter in said cable; and means biasing said damping element to a position intermediate the limits of rocking motion thereof.

2. A device for damping vibrations in tensioned cable and the like, comprising: a clamping bracket adapted to be fastened rigidly to said cable; a post having upper and lower ends; means adjustably mounting the lower end of said post on said bracket to dispose said post in a fixed vertical position above said cable; a damping element in the form of a horizontally disposed tube having closed ends; a freely movable body in said tube; means pivotally mounting said damping element on the upper end of said post for rocking motion thereon responsive to vibrations in said bracket; means on said damping element limiting the angle of rocking motion thereof with respect to said post and providing a counter-impulse in said post and bracket responsive to said vibrations to effect damping of the latter in said cable; and means biasing said damping element to a position intermediate the limits of rocking motion thereof.

3. A device for damping vibrations in tensioned cable and the like, comprising, in combination: a horizontally disposed damping element; support means for said element extending downwardly therefrom; a vertical post; a pivot mounting said support means on the upper end of said post; means on said support means extending below said pivot a predetermined distance on either side of said post providing a counter impulse in the latter upon rocking motion of said damping element about said pivot responsive to a vibration in said post; and a clamping device adjustable to mount said post rigidly in a vertical position on a tensioned cable.

4. A device for damping vibrations in tensioned cable and the like, comprising in combination: a horizontally disposed damping element; support means for said element extending downwardly therefrom; a vertical post; a pivot mounting said support on the upper end of said post; means on said support means extending below said pivot a predetermined distance on either side of said post providing a counter-impulse in the latter upon rocking motion of said damping element about said pivot responsive to a vibration in said post; a clamping device adjustable to mount said post rigidly in a vertical position on a tensioned cable; and spring means extending laterally from said post below said pivot to said support means.

5. A device for damping vibrations in tensioned cable and the like, comprising in combination: a vertical post; a horizontally disposed damping element above said post; spaced apart brackets extending downwardly from said damping element; side plates enclosing portions of said brackets and extending therebetween below said damping element to partially enclose said post; a pivot mounting said side plates on the upper end of said post; means on said side plates below said pivot spaced from said post and providing a counter impulse in the latter upon rocking motion of said damping element about said pivot responsive to a vibration in said post; and a clamping device adjustable to mount said post rigidly in a vertical position on a tensioned cable.

6. A device for damping vibrations in a tensioned cable and the like, comprising in combination: a vertical post; a horizontally disposed damping element above said post; spaced apart brackets extending downwardly from said damping element; side plates enclosing portions of said brackets and extending therebetween below said damping element to partially enclose said post; a pivot mounting said side plates on the upper end of said post; means on said side plates below said pivot spaced from said post and providing a counter-impulse in the latter upon rocking motion of said damping element about said pivot responsive to a vibration in said post; a clamping device adjustable to mount said post rigidly in a vertical position on a tensioned cable; and spring means extending laterally from said post below said pivot to said brackets.

7. A device for damping vibrations in tensioned cable and the like, comprising, in combination: a vertical post; a horizontally disposed damping element above said post; spaced apart brackets extending downwardly from said damping element; side plates enclosing portions of said brackets and extending therebetween below said damping element to partially enclose said post; a pivot mounting said side plates on the upper end of said post; means on said side plates below said pivot spaced from said post and providing a counter-impulse in the latter upon rocking motion of said damping element about said pivot responsive to a vibration in said post; a clamping device adjustable to mount said post rigidly in a vertical position on a tensioned cable; and upper and lower inwardly directed abutting flanges on said side plates.

8. A device for damping vibrations in tensioned cable and the like, comprising in combination: a vertical post; a horizontally disposed damping element above said post; spaced apart brackets extending downwardly from said damping element; side plates enclosing portions of said brackets and extending therebetween below said damping element to partially enclose said post; a pivot mounting said side plates on the upper end of said post; means on said side plates below said pivot spaced from said post and providing a counter-impulse in the latter upon rocking motion of said damping element about said pivot responsive to a vibration in said post; a clamping device adjustable to mount said post rigidly in a vertical position on a tensioned cable; spring means extending laterally from said post below said pivot to said brackets; and upper and lower inwardly directed abutting flanges on said side plates.

9. A device for dampening vibrations in tensioned cable and the like, comprising: a clamping bracket adapted to be fastened rigidly to said cable; a post having upper and lower ends; means adjustably mounting the lower end of said post on said bracket to dispose said post in a fixed vertical position above said cable; a damping element; means pivotally mounting said damping element on the upper end of said post for rocking motion thereon responsive to vibrations in said bracket; means on said damping element limiting the angle of rocking motion thereof with respect to said post and providing a counter impulse in said post and bracket responsive to said vibrations to effect damping of the latter in said cable; and biasing pressure means biasing said damping element substantially against actuation from exterior wind forces.

10. A device for damping vibrations in tensioned cable and the like, comprising: a clamping bracket adapted to be fastened rigidly to said cable; a post having upper and lower ends; means adjustably mounting the lower end of said post on said bracket to dispose said post in a fixed vertical position above said cable; a damping element; means pivotally mounting said damping element on the upper end of said post for rocking motion thereon responsive to vibrations in said bracket; means on said damping element limiting the angle of rocking motion thereof with respect to said post and providing a counter-impulse in said post and bracket responsive to said vibrations to effect damping of the latter in said cable; and biasing pressure means biasing said damping element substantially against actuation from exterior wind forces and normally maintaining said damping element in a position intermediate the limits of rocking motion thereof.

References Cited in the file of this patent

UNITED STATES PATENTS

| 1,901,860 | Austin | Mar. 21, 1933 |

FOREIGN PATENTS

| 477,310 | Germany | June 5, 1929 |
| 607,076 | Germany | Dec. 17, 1934 |